M. L. LACY
LIGHT ENERGY ABSORBING AND FILTERING DEVICE
FOR A MOTORCYCLE HELMET
Original Filed April 2, 1968
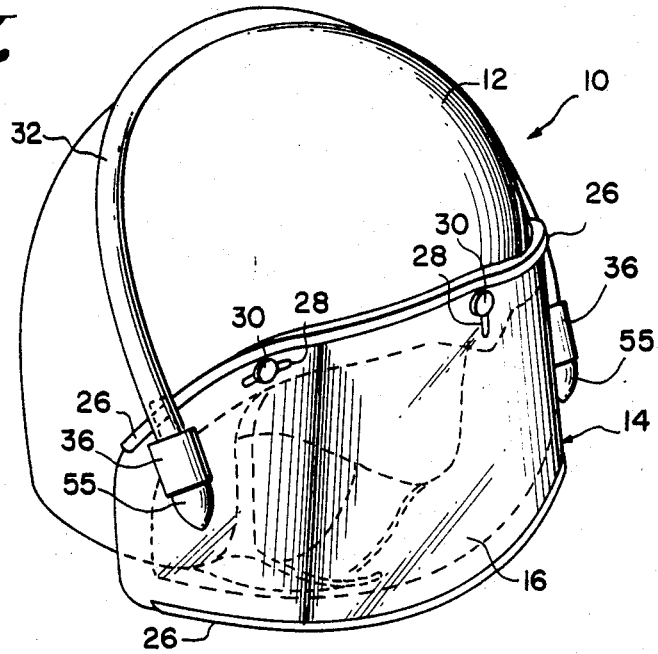
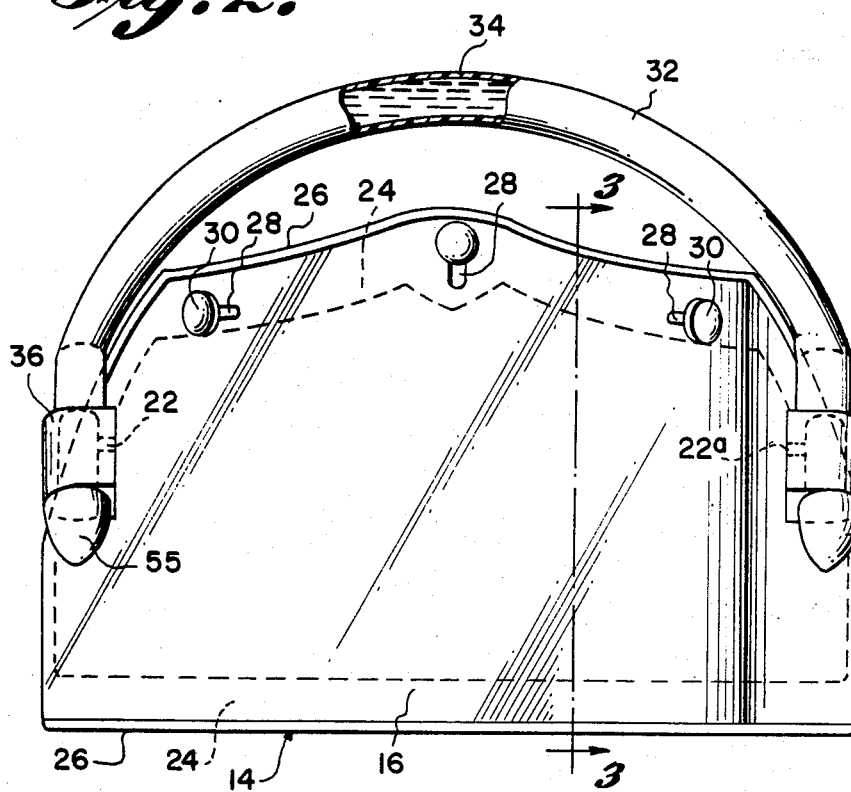
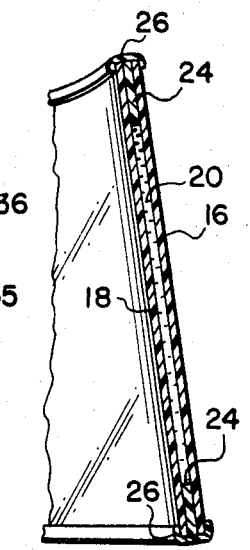
INVENTOR
MOUNT LEE LACY
BY *Stevens, Davis, Miller & Mosher*
ATTORNEYS July 4, 1972
M. L. LACY
3,674,344
LIGHT ENERGY ABSORBING AND FILTERING DEVICE
FOR A MOTORCYCLE HELMET
Original Filed April 2, 1968
2 Sheets-Sheet 2
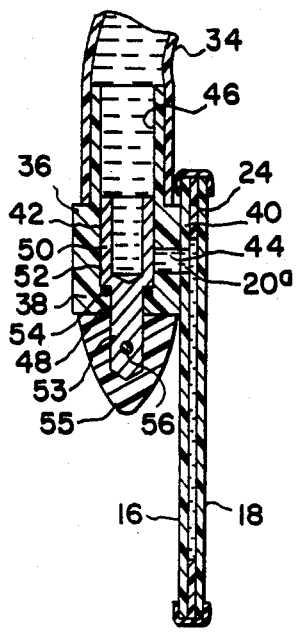
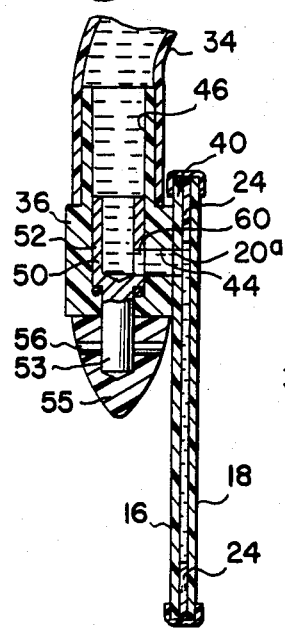
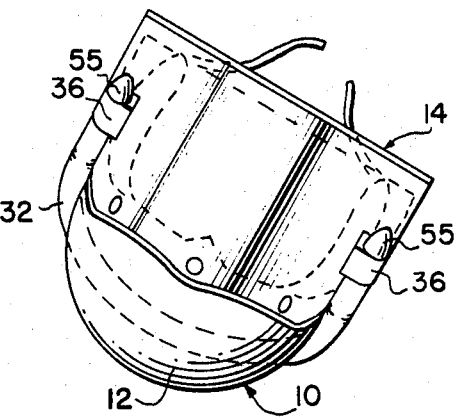
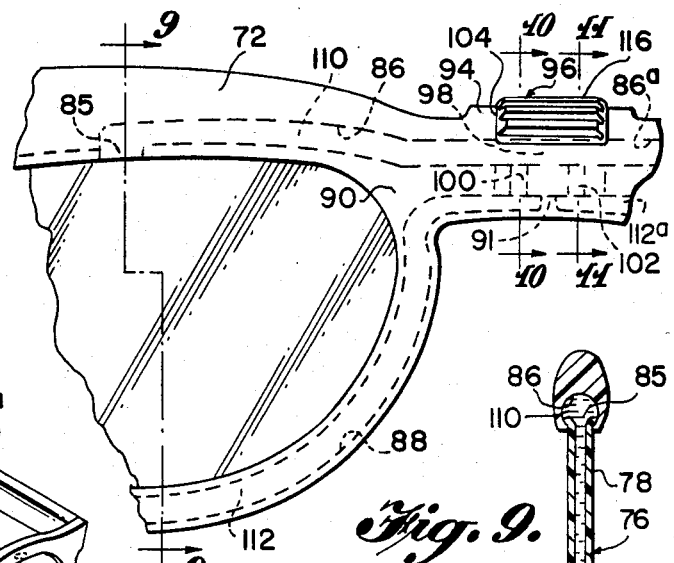
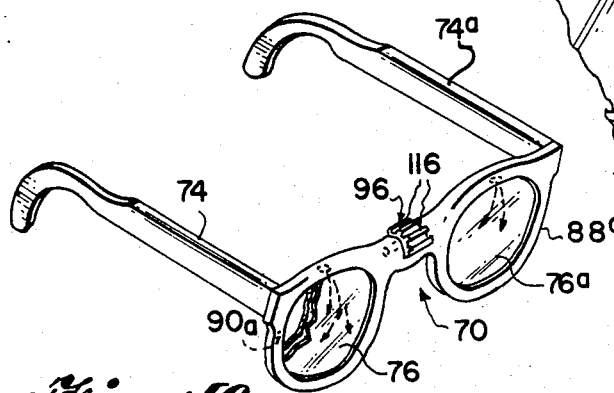
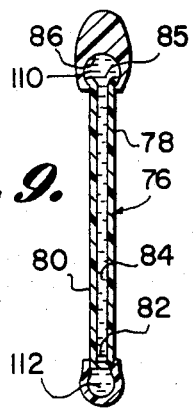
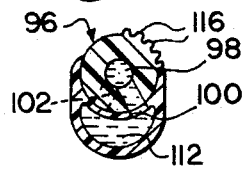
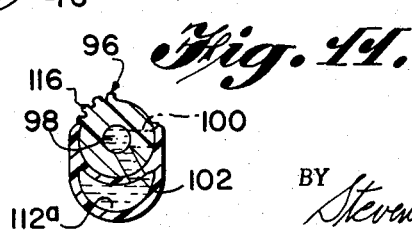
INVENTOR
MOUNT LEE LACY
BY *Stevens, Davis, Miller & Mosher*
ATTORNEYS United States Patent Office 3,674,344
Patented July 4, 1972

3,674,344
LIGHT ENERGY ABSORBING AND FILTERING
DEVICE FOR A MOTORCYCLE HELMET
Mount Lee Lacy, Daytona Beach, Fla., assignor to
M. L. Lacy, Ltd., Kansas City, Mo.
Continuation of application Ser. No. 718,182, Apr. 2, 1968, which is a continuation-in-part of application Ser. No. 628,984, Apr. 6, 1967. This application Mar. 30, 1971, Ser. No. 129,612
Int. Cl. G02b 5/24
U.S. Cl. 350—312
9 Claims

ABSTRACT OF THE DISCLOSURE

A device that adjusts the type and degree of shielding of the eyes from electromagnetic ray energy from the sun by presenting different degrees of screening and filtering of the ray energy, the device having a window-type shield that is formed from spaced layers of transparent material that are edge sealed to provide a thin light transmission cavity therebetween and a connecting storage container with valve means at the connection between the cavity and the container. The device holds two immiscible liquids of substantially equal volume that have different specific gravities so as to maintain separate liquid bodies within the device. By opening the valve means communication is established between the container and the cavity and tilting the device exchanges the liquids by gravity, at which time closing of the valve means maintains the exchanged liquid in the cavity to produce the desired change in shielding effect.

---

This invention relates to a wearable device such as a helmet, eye shield, glasses or the like that will screen and filter rays from the sun and that can change from one degree of screening and filtering to another to effect controlled transmission of solar radiation. This application is a continuation-in-part of my copending application Ser. No. 628,984 filed Apr. 6, 1967, now abandoned. This application is a continuation application of my copending application Ser. No. 718,182, filed Apr. 2, 1968, now abandoned.

Many attempts have been made to provide windows, roofs, and skylights with devices having means between sheets or plates of transparent material that would remove harmful or undesirable electromagnetic radiation from the sun, such as infrared rays, and the like. These devices employ a cavity or a series of cavities defined by spaced transparent plates and contain within the cavity liquid capable of screening or filtering the undesirable or unwanted radiation from the sun passing through the liquid in the cavity. One of the principal difficulties in using such devices is the requirement for changing from one liquid to another in order to change the type of filtering of the sun's rays to make such a system practical. Heretofore, the systems have not been air-free and thus the problem of air bubbles occurred bringing about interphase mixing of the liquids. To eliminate the interphase problems between liquids, some prior art systems utilized double cavity arrangements having a different liquid in each cavity. This type of system is bulky and expensive to build, operate, and maintain.

This invention presents a device that overcomes the difficulties of the prior art devices and contemplates an hermetically sealed, substantially air-free screening and filtering device for radiation from the sun by providing equally spaced sheets or plates of transparent material with a gasket between them positioned around their outer edge so as to form a thin, elongated cavity therebetween. Suitable entry and exit connections are provided between the cavity and the container to allow for flow of one liquid from the cavity as the other flows in from the container, thus displacing the liquid in the shield cavity with that in the container. When this has been completed, a valve means is closed to seal off the cavity from the container, thus retaining the desired liquid in the shield cavity.

It will be appreciated that, since each of the immiscible liquids has a different specific gravity, one will gravitationally position itself below the other and present a clearly delineated interphase between the liquids after any lighter liquid has permeated into the heavier during movement. Since each liquid has a different capability for the screening and filtering of the sun's rays, the type of filtering will depend on which liquid is in the cavity. For example, there may be little or no filtering when a light liquid is used, and there may be varying degrees or different types of filtering accomplished when a heavy liquid is used. The filtering, however, will depend on the ability of the liquid to screen out the rays rather than on its particular specific gravity.

The device of this invention is hermetically sealed with substantially all the air excluded from the system to reduce to a minimum the formation of air bubbles within the system when the liquids are being interchanged to effect different types of screening and filtering. When the heavy liquid is in the cavity, the lighter liquid is mainly in the container. To change from the heavy liquid in the cavity to a lighter one, a tilting of the device with valve means in open position conveys the heavy liquid from the cavity by gravity through an opening or openings in the cavity while the lighter liquid flows into the cavity through another valve means thus displacing the heavier one so that the lighter liquid enters the cavity as the heavier one is displaced. When the displacement is completed the valve means is closed, sealing the respective liquids from each other, and the device can then be placed in its normal position with a different liquid in the cavity to produce the desired change in shielding effect.

Advantageously, the elongated, relatively thin cavity of this invention may be somewhat curved or convex in form by using two mating, equally spaced, convex or curved transparent plates with a gasket around their edge to maintain them at an equal distance from each other, and thus form a rigid structural member that is capable of providing a relatively large transparent area, such as for eye shields that cover the face and the like. The curved arrangement of the transparent plates provides for strength of the cavity unit and maintains the space between the plates constant over a large service area. Also, the space between the transparent plates may be from about 1/32 inch to about 3/16 inch depending on the type of liquids to be used, the viscosity of the liquids, the thickness of cavity for the type of filtering to be done, and the type of use for which the device is designed.

It has been found that the liquids employed in this invention must be immiscible to each other and have good surface wetting properties for glass, Lucite, or other types of transparent material. The liquids also must have good cleaning action that leaves no residue and should have substantially the same viscosity. If infrared rays are to be screened out, glycol (antifreeze) may be used for the heavy liquid, and when light is to be admitted substantially unfiltered, white mineral oils (light oil) may be used. Exemplary of these light oils are the Penn-Drake white mineral oils known as "Drakeol 6." Their "Drakeol 7" and "9" and "Clearteck," "Liteteck," and "Peneteck" also may be used. These Penn-Drake oils are produced by the Pennsylvania Refining Company and the properties of the oils are disclosed in their bulletin entitled "Product Specifications Penn-Drake White Mineral Oils." It will be appreciated that the heavy liquid may contain various colors in solution or a true suspension capable of filtering different types of solar radiation, and that denity of the color in the liquid may be such as to effect the required degree of filtering in relation to the cavity.

The screening and filtering device of this invention may be used in eye shields for motor cycle helmets, eye glasses or any other tiltable ray shielding type of device.

These and other objects of my invention will become apparent from the description of the following embodiments and the drawings thereof in which:

FIG. 1 is a view in perspective of a motor cycle helmet showing my screening and filtering device positioned on it;

FIG. 2 is a view in elevation of the helmet of FIG. 1 showing the screening and filtering device with a section of the container for holding the liquid not in shielding position broken away;

FIG. 3 is a cross-sectional view taken on the line 3—3 of FIG. 2 showing the transparent plates spaced apart by a gasket to provide the thin, elongated cavity for holding one of the liquids;

FIG. 4 is a fragmentary cross-sectional view of the valve means shown in FIG. 2 in closed position;

FIG. 5 is a fragmentary cross-sectional view of the valve means shown in FIG. 2 in open position;

FIG. 6 is a view of the helmet in tilted position with the valve means open to exchange the liquid in the cavity with that in the container by gravitational flow;

FIG. 7 is a view in perspective of eyeglasses showing a valve in the bridge and the spaced lenses broken away to show the cavity between the eyeglass portion and the compartments in the rim portion;

FIG. 8 is an enlarged view of the eyeglasses of FIG. 7 with the valve means in open position;

FIG. 9 is a cross-sectional view taken on the line 9—9 of FIG. 8 showing the relationship of the compartments in the rim of the eyeglasses and the valve means;

FIG. 10 is a cross-sectional view taken on the line 10—10 of FIG. 8 showing the valve in an open position; and FIG. 11 is a cross-sectional view taken on the line 10—10 of FIG. 8, showing the valve in a closed position.

In the drawings numeral 10 illustrates a standard motor-cycle helmet having a hard head covering 12 and a detachable face shield assembly 14. The face shield assembly 14 is formed from two curved sheets or plates 16 and 18 of transparent plastic such as "Lucite," equally spaced from each other to form a cavity 20 therebetween. Plate 16 has an opening 22 in the upper margin of one side thereof and a second opening 22a in the other side margin thereof. The plates 16 and 18 are held in spaced relation to each other by a gasket 24 which may be tubular and is positioned between the outer edges of the plates to space them apart so as to define therebetween the cavity 20. Communication with the cavity is provided by the circular openings 22 and 22a.

The plates 16 and 18 may be held together in a sandwich assembly by any suitable type of holding means such as by cementing the edges of the plates to the gasket to form the sandwich, or by employing a clip arrangement over the edge to hold them in sealed relationship with the gasket. A U-shaped edging channel 26 fits over the edge of the plate assembly to provide an edging that has a smooth appearance and does not show the edge fabrication. In the upper margin of the plate assembly is a series of spaced slots 28 which pierce through the plates in the gasket area and have positioned in them studs 30 for attaching the shield assembly to mating stud pins 31 positioned on the upper margin of the front of the hard head cover so that the shield can be positioned and held so as to function properly when on the head of the wearer (see FIGS. 1, 2 and 3).

The detachable face shield assembly 14 has attached to it a liquid container 32 which is positioned in semi-circle form extending around the dome of the hard head cover from one side of the shield to the other. The liquid container is an elongated plastic tube 34 with a liquid capacity of approximately that of the space 24 defined by the spaced plates 16 and 18 and gasket 24. Each end of the tube 34 is attached to a valve housing 36. The valve housing has a base 38 with a flat-like portion 40 that is adapted to fit against the outer surface of plate 16, and is cemented thereto. In the valve housing is a central cylindrical cut-out portion 42 which has a circular housing opening 44 in flat portion 40 which is in registry with holes 20 and 20a respectively in plate 16, one housing being attached on one side of plate 16 and a second housing being attached on the other side of plate 16. Extending from base 38 is an annular extension 46 that is integral with the base and in registry with the cylindrical cut-out section 42. Annular extension 46 has an outside diameter equal to the inside diameter of the elongated tube 34 into which it fits and is cemented thereto to form a seal, and the inside diameter of the extension corresponds to the inside diameter of the central cylindrical cut-out section 42. The bottom of the central cylindrical cut-out section defines a second circular opening 48.

Numeral 50 illustrates a valve member which has an annular valve portion 52 and a stepped down solid cylindrical bottom portion 53. The cylindrical bottom portion 53 extends through the circular opening 48 with a portion of it extending downward beyond the bottom of base 38. Between the bottom of central cylindrical cut-out portion 42 and the stepped down portion is an annular O-ring gasket 54 which seals the valve in the valve housing and prevents any leakage of liquid through opening 48 when the valve is assembled in functioning position. The outwardly extended end of the stepped down portion 53 has a rotating knob 55 attached to it, held in position by a pin 56 to provide a means for turning the valve member 50 in the central cylindrical cut-out section 42.

The side wall of the top annular valve portion 52 of valve member 50 defines a circular valve opening 60 which is of the diameter of opening 44 in the base 38 of the valve housing, and the openings 20 and 20a in plate 16. The circular opening 60 is positioned so that it is in registry with circular housing openings 44 and circular openings 20 and 20a in plate 16. Thus, by turning knob 54, opening 60 can be brought in line or out of line with openings 44 and 20 that are in themselves in fixed registry. When circular valve opening 60 is in line with openings 44 and 20, there is communication between the liquid container through the annular valve portion positioned in the valve housing 36 and the cavity, and when circular valve opening 60 is turned so that it is completely out of registry with openings 44 and 20, the cavity is sealed from the liquid container (see FIGS. 4 and 5).

FIGS. 7, 8, 9, 10 and 11 show an alternate device of my invention in which an eye shield in the form of eyeglasses is provided that can be adjusted to change the amount of light rays that pass through the lenses of the glasses. Numeral 70 illustrates the eyeglasses having a frame 72 with a pair of hinged stem pieces 74 and 74a which secure the glasses on the head of the wearer. Frame 72 has lenses 76 and 76a, each of which is formed from two separate plates of glass or plastic 78 and 80 that are separated from each other by a peripheral gasket 82 to form a sandwich assembly defining a thin elongated cavity 84 therebetween. The gasket 82 extends about the edge of the two separated plates except for a space near the top of them to define an opening 85 which permits communication with cavity 84 (see FIGS. 8 and 9).

The frame 72 has an upper channel 86 and 86a and a lower channel 88 and 88a, one pair of channels in one half of the glasses and the other pair of channels in the other half, the upper and lower channels being separated from each other by channel stops 90 and 90a in each half of the glasses and by stop 91. The frame also has a bridge 94 with a rotatable valve means 96 in it. The valve means defines a longitudinal opening 98 which extends through the horizontal length of the valve means and connects with the upper channels 86. A second circular opening 100 is positioned normal to opening 98 and communicates with it and the channel 88. A third circular opening 102 is positioned normal to hole 98 and communicates with it. Openings 100 and 102 are in different angular planes so that when opening 100 communicates with channel 88, opening 102 is closed to channel 88a. Valve means 96 fits into a slot 104 in the top portion of bridge 94, with the longitudinal opening 98 communicating with channel 86 and the opening 100 communicating with channel 88 when the rotatable valve means 96 is turned in one direction aid with channel 88a when it is turned in the other direction. When the valve means is centered then both openings are closed.

The lens assembly 76 and 76a when mounted in frame 72 forms upper compartments 110 and 110a and lower compartments 112 and 112a that are defined by the channel wall and the edge of the lens assemblies. The upper compartment 110 communicates with the cavity 84 through opening 85 in the lens assembly and the horizontal longitudinal opening 98, and the lower compartment communicates with the circular opening 100 on one half of the glasses and the same structural arrangement in the other half of the glasses, so that, when the valve means is rotated so that the circular opening 100 communicates with lower compartment 112, the liquid can be interchanged from cavity 84 and upper compartment 110 with the liquid in the lower compartment 112 by placing the eyeglasses in a position so that the heavy immiscible liquid will be forced to flow by gravity through the valve to displace the lighter liquid which will permeate and rise through it, and the same results when the valve is turned so that the liquid in cavity 84a and upper compartment 110a can be interchanged with liquid in compartment 112a. After the immiscible liquids have exchanged places, the valve can be closed to maintain the liquids in their respective places regardless of the effect of gravity due to movement of the eyeglasses.

The valve 96 also has serrations 116 which are positioned so as to serve as a stop to bring the opening 100 or opening 102 in an open position for the exchange of liquids and to facilitate rotation of the valve. Also, the rotatable valve may have end gaskets such as O-rings to assure a positive seal of the liquid within the system so as to prevent dripping from the valve means.

It will be appreciated in the device of my invention that when one valve means is used between the cavity and the compartment, and the valve is open and the device positioned so that the heavier liquid displaces the lighter one, the displacement is accomplished by the lighter liquid permeating through the heavier one. Also, in the case of eye-glasses a double valve arrangement can be provided for each lens so that instead of the permeation of a lighter liquid through the heavier one, positive displacement takes place with the heavier liquid passing through one valve arrangement and the lighter liquid passing through the other valve when the device is tilted or rotated and then by closing the two valves the changed liquid can be retained in the cavity.

It will be further appreciated that one liquid can be clear and effect substantially no filtering or screening, and the other liquid can be colored or tinted so as to absorb, screen or filter a large quantity of solar energy passing through it. Where coloring or tinting of the liquid used in my devices is desired, it can be done by a suitable dye or finely divided pigment placed in the liquid that is capable of staying in permanent suspension in it.

In operation, equal amounts of two immiscible liquids having different specific gravities are placed in the volumetric space provided by the compartment and the cavity of the device in a manner so as to exclude all air from the space, which is then hermetically sealed. When two or more valves are used they are placed in open position and the device tilted to effect by gravity the settling or rising of one liquid into the cavity by allowing the heavier liquid to seek a low point with the lighter liquid resting above it. After the liquids have separated, the valves are closed and the device may be placed in any position without disturbing the liquids, which then provide the desired shielding from the solar energy. When a single valve is used the lighter liquid will permeate through the heavier liquid to effect a change of liquid in the cavity by tilting the device.

In devices that are subject to considerable movement, such as eyeglasses, it is preferable that the cavity be of smaller volume than the retaining compartment so that, when the valve is closed, substantially none of the second immiscible liquid can be trapped in the cavity.

It will be appreciated that any two immiscible liquids having different refractive or absorptive characteristics may be used, Also, the valve means should preferably be positioned so that most of one of the liquids can be gravitationally interchanged with the other liquid in a manner so as to provide substantially one liquid in the cavity. This is best accomplished by having the valve means at the top of the cavity so that, by tilting, the lighter liquid is forced to permeate through the heavier liquid as it falls by force of gravity.

It will also be appreciated that a suitable mechanical tilting means may be used to tilt the device when such means is desired or necessary.

Various modifications of the specific embodiments described and shown may be made, and it is understood that the specific embodiments are by way of illustration of the invention and not limiting thereof.

What is claimed is:

1. A light energy absorbing and filtering device comprising two spaced curved transparent plates defining a closed thin cavity therebetween, a liquid storage compartment defined by a tubular member each end of said member connected to and communicative with said cavity, said cavity and compartment containing two bodies of immiscible liquids hermetically sealed in the device, each body of liquid having a different specific gravity and ray absorptive and filtering properties; and valve means being provided in both ends of the tubular member for communicating the cavity with said compartment whereby, when the valve means is open and the device is tilted, gravity movement of the heavier liquid displaces the lighter liquid to produce an exchange of liquids between the cavity and the compartment, and when the valve means is closed, the changed liquid is sealed in the cavity.

2. The light energy absorbing and filtering device of claim 1 in which the spaced plates are plastic.

3. The light energy absorbing and filtering device of claim 1 in which the spaced plates are glass.

4. The light energy absorbing and filtering device of claim 1 in which said transparent plates are in a shield for a motorcycle helmet.

5. The light energy absorbing and filtering device of claim 1 in which the spaced plates are in a tiltable structure.

6. The light energy absorbing and filtering device of claim 1 in which said immiscible liquids are oils of different specific gravities.

7. The light energy absorbing and filtering device of claim 1 in which said immiscible liquids are of different colors.

8. The light energy absorbing and filtering device of claim 6 in which one oil is a light mineral oil and the other is a heavy glycol.

9. The light energy absorbing and filtering device of claim 1 in which the interphase between the two liquids in the device is broken and redefined as one liquid permeates through the other liquid to bring about a change from one liquid to the other in the cavity.

References Cited
UNITED STATES PATENTS

| | | | |
|---|---|---|---|
| 786,613 | 4/1905 | Villain | 350—312 |
| 2,439,553 | 4/1948 | Winn | 350—312 X |

JOHN K. CORBIN, Primary Examiner

T. H. KUSMER, Assistant Examiner

U.S. Cl. X.R.

2—6; 351—44, 163